Patented Aug. 31, 1943

2,328,269

UNITED STATES PATENT OFFICE 2,328,269

MOLDING MATERIAL

Walter E. Gloor, Milltown, N. J., assignor to Hercules Powder Company, Wilmington, Del., a corporation of Delaware No Drawing. Application June 27, 1940, Serial No. 342,703

4 Claims. (Cl. 106—177)

This invention relates to thermoplastic molding compositions and to molded articles made therefrom and more particularly it relates to cellulose acetate plastic compositions and articles molded therefrom characterized by stability of shape and dimension.

Cellulose acetate compositions have found considerable use in the plastics industry because of their ready moldability. Such compositions consist essentially of cellulose acetate having a combined acetic acid content of 52 to 55% in most cases and plasticizing agents which lower the softening point of the cellulose acetate in proportions of about 60–65% cellulose acetate and about 35–40% plasticizer. However, such compositions have not been entirely satisfactory and have been unable to replace the more inflammable Celluloid in many applications because of the marked tendency of molded articles prepared therefrom to warp, shrink, or otherwise change their dimensions. In addition to the tendency to warp and shrink, cellulose acetate thermoplastics have been too soft to hold their shape at moderately warm temperatures such as those encountered in the ordinary household washing of cutlery and similar articles.

Attempts to overcome these disadvantages by the use of a diminished quantity of plasticizing agent or by the use of agents which have little softening effect have been unsuccessful because the resulting composition was either brittle or incapable of forming a uniform coherent molded article.

Attempts to utilize cellulose acetate of higher acetic acid content which is known to be less sensitive to water but also considered to be hard, horny, somewhat brittle, and not amenable to molding, have also been unsuccessful. The material gave brittle moldings and when plasticized with fairly large quantities of plasticizer, a soft, cheesy molding still not tough enough for use was obtained. Thus, the material had a higher softening point than ordinary plastics cellulose acetate but yet increased plasticizer did not overcome brittleness of moldings made therefrom. A satisfactory impact strength was obtained only when plasticizer was increased to a point where the plastic was too soft for use.

It is an object of this invention to provide an improved thermoplastic molding composition capable of being formed into tough articles which are stable in dimension and substantially free from warping and shrinking defects and to provide molded articles of the character described.

It is a further object of this invention to provide a tough cellulose acetate thermoplastic molding composition, molded articles of which will not warp, distort, or shink at the moderately elevated temperatures of ordinary household use and ordinary household washing conditions.

It is a still further object to provide tough molded articles which retain their hardness not only at their temperatures of use but also at the temperatures of ordinary household washing conditions, i. e. from about 140° F. to about 176° F.

These and further objects will be apparent from the more detailed description of the invention which follows:

These objects are achieved in accordance with this invention by compositions comprising between about 66% and about 75% by weight of a cellulose acetate having a combined acetic acid content between about 56% and about 58% calculated as acetic acid, and between about 34% and about 25% by weight of a plasticizing mixture having certain well defined specifications. The plasticizing mixture which is utilized in the quantity mentioned will comprise two modifiers. It will comprise a single substance or a mixture of substances which are tougheners, softeners, or solvents for cellulose acetate within the acetic acid range hereinabove mentioned in amount between about 33% and about 88% by weight, preferably between about 75% and about 88%, of the total plasticizer mixture, and it will also comprise a single substance or a mixture of substances which will coact with cellulose acetate of the acetic acid content mentioned to form a gel structure characterized by rigidity or lack of plastic flowability at the temperatures of ordinary use of molded plastic articles, the said gel-forming substances being in quantity between about 12% and about 67% by weight, preferably between about 25% and about 12%, of the total plasticizing mixture content.

The cellulose acetate utilized will be of a substitution to have a combined acetic acid content between 56% and 58%, preferably between 56.5% and 57.5% in order to obtain the desirable properties of the composition and article of this invention.

It has been found that when two different modifiers of the classes mentioned are combined with the particular type of cellulose acetate specified within the ranges of compositions set forth, a moldable, tough, yet rigid composition results which is greatly improved in stability of initial molding dimensions, and in freedom from warping and shrinking at the temperatures of ordinary use. It is believed that this result is brought about by the formation of a three dimensional gel structure as distinguished from the ordinary plastic or colloidal solution type of structure. This gel structure is believed to be brought about by coaction of the particular arrangement of active groups found in the cellulose acetate of the type specified with the active groups having the arrangement characteristic of the gel-forming modifiers. However, it will be appreciated that the internal structure believed brought about in accordance with this invention is not a simple gel structure but is a gel structure modified to achieve a certain degree of resilience by the inclusion of softening modifiers in the quantity set forth. Thus, it is believed that the results obtained with the compositions in accordance with this invention are brought about by a certain arrangement of association forces binding together active groups of the cellulose acetate chain with active groups of the modifying substances utilized therewith.

It will be noted that considerably less plasticizer is used than is customary in plastics based on cellulose acetate of lower acetic acid content in spite of the higher softening point of the acetate herein utilized. This is an essential element of this invention since with the usual quantities of plasticizer an unsatisfactory product is obtained.

The gel structure forming components of the plasticizing mixture used in accordance with this invention is a substantially non-volatile substance compatible with cellulose acetate of the acetyl content hereinbefore specified and having a plurality of active groups such as ester or carboxyl linkages capable of association with the active groups of the cellulose acetate chain. These substances are characterized by a more or less complex three-dimensional studding of the active groups. Suitable substances of the group are, for example, triphenyl phosphate, sucrose octa-acetate, mannitol hexa-acetate, sorbitol hexa-acetate, methyl phthallyl methyl glycollate, methyl phthallyl ethyl glycollate, ethyl phthallyl ethyl glycollate, ethyl phthallyl methyl glycollate, para-toluene ethyl sulphonamid, cyclohexyl sulphonamid, para-toluene ethyl sulphonate, diphenyl phthalate, ortho and para-toluene sulphonamids, methyl (or ethyl) 2-nitro 2-methyl 1-propyl phthalate, etc.

Components of the plasticizing mixture utilized in accordance with this invention of the softening or resilience inducing type are usually substances having active groups arranged in a linear or planar form or which are capable of arrangement of the active groups into linear or planar forms. Substances of this nature suitable for use in the composition of this invention are, for example, diethyl phthalate, dimethyl phthalate, dimethylcellosolve phthalate, diethylene glycol diacetate, diethylene glycol dipropionate, glycerol triacetate, glycerol tripropionate, or the like.

If desired, the compositions and plastics in accordance with this invention may comprise fillers and pigments and dyes which may be added for the purposes of cheapening the plastic or giving it opacity or color. As a rule such materials will be utilized in relatively small quantities. For example, solid fillers and pigments will be utilized preferably in a quantity below about 5% of the composition. Soluble dyestuffs will in general be utilized in a quantity of about 0.05% of the finished plastic where they are utilized.

The composition in accordance with this invention will comprise the hereinbefore mentioned ingredients in the form of a colloided mass or a molding powder prepared therefrom. The colloided condition is conveniently achieved by mixing the ingredients to form a paste preferably with the aid of a volatile solvent, completing the colloiding operation on a heated differential two roll mill, rolling the colloided mass on the heated mill until nearly all of the volatile solvent has been driven off, sheeting the material upon the roll, cooling the sheeted material and seasoning it to allow escape of residual volatile solvents. The cooled sheeted material may be reduced to a molding powder by means of a hammer mill or rotary cutter or other reducing means, either before or after the seasoning operation. For example, cellulose acetate of the character hereinbefore mentioned, the components of the plasticizing mixture, any filler or coloring matter which may be used, may be mixed with about 30–50% by weight of the sum of these various components of a volatile solvent or solvent mixture such as, for example, acetone, 9:1 acetone-alcohol, methyl acetate, or the like. The paste so formed may then be rolled on a two roll mill with the rolls of the mill at a temperature of approximatey 180° F. for a period of about 15 minutes or until volatile solvent has been substantially eliminated. The colloided mixture is then removed from the roll in sheet form, cooled, and reduced to a molding powder in a rotary mill or cutter.

Molded articles may be prepared from the compositions described but the molding procedure utilized is critical and is an essential element in obtaining the molded articles in accordance with this invention. The utilizaton of normal molding conditions may result in a molded article which is apparently sound but it will be found that such an article lacks toughness and impact strength. Molded articles according to this invention are prepared by a method which comprises heating a molding composition of the character herein described to a temperature in the range between 380° F. and 450° F. (preferably between 400 and 430° F.) and shaping the composition so heated to the desired article with pressure. The pressure will be at least 200 lbs./sq. in. Preferably the composition is heated and shaped in an injection molding cylinder and mold assembly.

The molded articles in accordance with this invention are characterized by toughness, high impact strength, hardness, and substantial freedom from warping in use. They are further distinguished by a characteristic appearance when viewed by polarized light transmitted through the article (in an unpigmented or translucent form of composition), e. g., they show up as a substantially uniform field of light with simple strain lines when viewed between crossed Nicol prisms, Polaroid sheets, or the like. Weak molded articles made under normal molding conditions present a complex field broken up into many granular multi-colored spots when tested with polarized light, and viewed with crossed Nicol prisms.

The hardness of molded articles in accordance with this invention will be at least 20 on the Rockwell M-scale using the Rockwell method, yet the impact strength will be good, i. e. in excess of 1.8 ft. lbs./sq. in. by the Charpy method.

This invention is more specifically illustrated by the examples given in the table. These examples give typical compositions according to this invention. All parts and percentages herein and in the claims are by weight.

*Table I.—Injection molding compositions*

| | I | II | III | IV | V | VI | VII | VIII |
|---|---|---|---|---|---|---|---|---|
| Cellulose acetate 57.0% acetic acid | 72 | 69 | 69 | 72 | 72 | 71 | | |
| Cellulose acetate 57.0% acetic acid | | | | | | | 69 | 66 |
| Dimethyl phthalate | 15 | | | | | 17 | 12 | 13 |
| Diethyl phthalate | | 20.67 | 20.67 | 18.7 | | | 12 | 13 |
| Methoxyethyl phthalate | | | | | | | | |
| Diethylene glycol dipropionate | | | | | 9.33 | | | |
| Phthalate of mixture of methanol and methoxyethanol | | 5.16 | 5.16 | 4.65 | | | | |
| Methyl phthallyl methyl glycollate | 13 | | 5.16 | 4.65 | 9.33 | | | |
| Methyl phthallyl ethyl glycollate | | | | | | 8 | | |
| Triphenyl phosphate | | 5.16 | | | 9.33 | 4 | 7 | 8 |

The ingredients of the compositions in the table were mixed together with the addition of 48 parts of acetone per 100 parts of non-volatile ingredients in a jacketed heavy dough mixer, water at 140° F. flowing through the jackets of the mixer. In about 20 minutes a substantially uniform, turbid, somewhat crumbly, gel was formed. This was then worked on a differential two roll mill with one roll cold, the other heated at 180° F. until a smooth mix which worked with considerable noise was obtained. The mixture was then removed in sheet form, cooled, and cut into granulated form in a cutter of the Wiley mill type. The granulated powder was then dried to a volatile material content of less than 0.6% in a circulating air oven at 60–70° C. The compositions were injection molded in a conventional injection molding machine at temperatures of 380°–450° F., best results being obtained at temperatures of about 425° F.

Molded articles prepared from compositions in accordance with this invention are characterized especially by freedom from the tendency to warp which has heretofore been evident in cellulose acetate thermoplastics. They do not shrink, crack around inserts, or otherwise change in dimension under the conditions of ordinary use. For example, they are tough yet free of plastic flow under the stresses of prolonged and rough use at temperatures say from about 10° F. to about 110° F. In addition the compositions are tough, hard, and do not warp or soften at the temperatures encountered in household cleaning such as in dishwashing, i. e. temperatures between about 140° F. and about 176° F. The compositions are also characterized by resistance to mild alkalies such as warm soapy water.

It will be understood that the details and examples hereinbefore set forth are illustrative only, and that the invention as broadly described and claimed is in no way limited thereby.

What I claim and desire to protect by Letters Patent is:

1. A molding composition comprising between about 66% and about 75% by weight based on the total acetate and plasticizer of cellulose acetate having a combined acetic acid content between 56% and 58% and between about 34% and about 25% of a plasticizing mixture, said mixture comprising between 75% and 88% of a substantially non-volatile softening and toughening plasticizer selected from the group consisting of dimethyl phthalate, diethyl phthalate, dimethylcellosolve phthalate, diethylene glycol diacetate, diethylene glycol dipropionate, glycerol triacetate, glycerol tripropionate; and between 12% and 25% of a substantially non-volatile plasticizer which forms a substantially rigid gel structure with cellulose acetate selected from the group consisting of triphenyl phosphate, sucrose octa-acetate, mannitol hexa-acetate, sorbitol hexa-acetate, methyl phthallyl methyl glycollate, methyl phthallyl ethyl glycollate, ethyl phthallyl ethyl glycollate, ethyl phthallyl methyl glycollate, para-toluene ethyl sulphonamid, cyclohexyl sulphonamid, para-toluene ethyl sulphonate, diphenyl phthalate, ortho-toluene sulphonamid, para-toluene sulphonamid, and methyl 2-nitro 2-methyl 1-propyl phthalate.

2. A molding composition comprising the following materials:

Parts (about)
Cellulose acetate having a combined acetic
 acid content between 56% and 58% _____ 69
Diethyl phthalate _____ 20
Triphenyl phosphate _____ 5
Phthalate of a mixture of methanol and
 methoxy ethanol _____ 5

3. A molding composition comprising the following materials:

Parts (about)
Cellulose acetate having a combined acetic
 acid content between 56% and 58% _____ 69
Diethyl phthalate _____ 20
Phthalate of a mixture of methanol and
 methoxy ethanol _____ 5
Methyl phthallyl methyl glycollate _____ 5

4. A molding composition comprising the following materials:

Parts (about)
Cellulose acetate having a combined acetic
 acid content between 56% and 58% _____ 71
Dimethyl phthalate _____ 17
Methyl phthallyl ethyl glycollate _____ 8
Triphenyl phosphate _____ 4

WALTER E. GLOOR.

CERTIFICATE OF CORRECTION.

Patent No. 2,328,269.                                                August 31, 1943.

WALTER E. GLOOR.

It is hereby certified that error appears in the printed specification of the above numbered patent requiring correction as follows: Page 1, second column, line 3, for "shink" read --shrink--; line 16, after "weight" insert the words --based on the total acetate and plasticizer--; page 2, first column, line 72, for "preferaby" read --preferably--; and second column, line 28, for "approximatey" read --approximately--; page 3, second column, line 52, claim 4, for "moterials" read --materials--; and that the said Letters Patent should be read with this correction therein that the same may conform to the record of the case in the Patent Office.

Signed and sealed this 2nd day of November, A. D. 1943.

(Seal)                                                            Henry Van Arsdale,
                                                                  Acting Commissioner of Patents.